R. A. FESSENDEN.
SYSTEM OF STORING POWER.
APPLICATION FILED APR. 2, 1906.
1,112,441.
Patented Oct. 6, 1914.
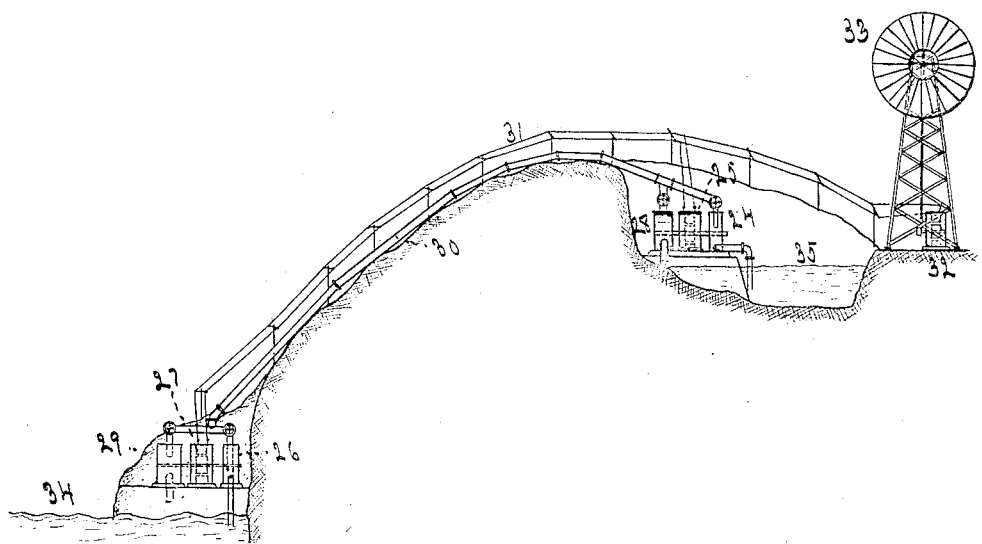
Witnesses.
Inventor:

UNITED STATES PATENT OFFICE.

REGINALD A. FESSENDEN, OF BRANT ROCK, MASSACHUSETTS.

SYSTEM OF STORING POWER.

1,112,441.

Specification of Letters Patent. Patented Oct. 6, 1914.

Application filed April 2, 1906. Serial No. 309,471.

*To all whom it may concern:*

Be it known that I, REGINALD A. FESSENDEN, a citizen of the United States, residing at Brant Rock, in the county of Plymouth, State of Massachusetts, have invented a certain new and useful System of Storing Power; of which the following is a specification.

The problem of the storage of energy is one of the utmost importance. Upon the discovery of the method of storing energy cheaply and efficiently depends the ability of mankind to utilize such natural sources of energy as the wind, the radiation from the sun, and the like. At the present time there is no known and general means by which this can be accomplished commercially. The most efficient means at present known is the storage battery. This is, however, only useful on a small scale or as means of smoothing out sudden fluctuations in power because on a large scale the cost of storing power with a storage battery is more than the cost of producing it by steam engine.

I have discovered a method of storing up energy at a cost including interest and depreciation not to exceed $3.00 per horsepower year, thus permitting power derived from natural sources to be stored and furnished at a cost competing with present steam and gas engine plants. Moreover the method, in spite of the fact that the object is one greatly needed and long sought for unsuccessfully, is of the utmost simplicity and can be used for stationary plants in any place or country and thus the problem so important to mankind of storing up the energy derivable from natural sources is completely and commercially solved.

The drawing which accompanies and forms a part of this specification illustrates one arrangement of apparatus whereby my method may be realized in practice.

In the drawings,—the figure shows an apparatus for using wind power and for conserving all the power where the natural circumstances are not favorable on account of an intervening height of land lying between two reservoirs which are so far apart that a mechanical drive is not possible from a windmill located near one reservoir to a pump located near the other. In this case the liquid circulates over such intervening elevation and use is made of what I call an "electrical siphon."

In the particular drawing selected for more fully disclosing my invention, 25 and 27 are dynamos capable of operating either as motors or generators and are preferably of the series type.

24, 26 are pumps, 28, 29 are turbines, 30 is a pipe line, 31 is an electric transmission line, 32 is a dynamo operated by the windmill 33.

In operation the windmill 33 drives the dynamo 32, the electric generator 27 being connected to act as a motor and drive the pump 26. Water is therefore pumped from the lower reservoir 34 into the upper reservoir 35. This water is caused to pass through the turbine 28 and to drive the dynamo 25 as a generator thereby restoring some of the power to the system. When it is desired to utilize the power the generator 25 is caused to act as a motor and drive the pump 24 so as to cause water to flow through the pipe 30. This water in descending is caused to operate the turbine 29 which is made to drive the dynamo 27 as a generator thus furnishing current to the line and at the same time operating the dynamo 25 as a motor. As the two dynamos are series wound they automatically regulate each other and in this way water can be transmitted economically over heights of land where an ordinary siphon could not work and where the digging of a tunnel would be too expensive.

I do not limit myself to the specific apparatus shown, inasmuch as many modifications may be made therein without departing from the principle of my invention.

I claim:

1. The combination with two reservoirs at different elevations, of a siphon pipe connecting them, and means for utilizing the energy of the falling water in both legs of the siphon to produce electrical energy.

2. The combination with a windmill and two reservoirs at different elevations, of an electric machine operated by the windmill, a pump in the lower reservoir, an electric machine near the lower reservoir provided with a driving turbine, and electric connections by which the two electric machines may be operated indifferently by either the windmill or the turbine, to pump water from the lower to the upper reservoir.

Signed at Brant Rock, in the county of Plymouth and State of Massachusetts, this 29th day of March, A. D. 1906.

REGINALD A. FESSENDEN.

Witnesses:
 JESSIE E. BENT,
 PHILIP T. POST.